United States Patent
Van De Kooij et al.

(10) Patent No.: US 11,236,294 B2
(45) Date of Patent: Feb. 1, 2022

(54) MINIBREWERY

(71) Applicant: MINIBREW HOLDING B.V., Utrecht (NL)

(72) Inventors: Bart Van De Kooij, Amsterdam (NL); Olivier Van Oord, Utrecht (NL)

(73) Assignee: MiniBrew Holding B.V., Utrecht (NL)

(*) Notice: Subject to any disclaimer, the term of this patent is extended or adjusted under 35 U.S.C. 154(b) by 179 days.

(21) Appl. No.: 16/093,075

(22) PCT Filed: Apr. 13, 2017

(86) PCT No.: PCT/EP2017/058974
§ 371 (c)(1),
(2) Date: Oct. 11, 2018

(87) PCT Pub. No.: WO2017/178607
PCT Pub. Date: Oct. 19, 2017

(65) Prior Publication Data
US 2019/0136164 A1    May 9, 2019

(30) Foreign Application Priority Data

Apr. 13, 2016  (NL) ..................................... 2016597

(51) Int. Cl.
*C12C 13/10*    (2006.01)
*C12C 7/04*     (2006.01)
(Continued)

(52) U.S. Cl.
CPC .............. *C12C 13/10* (2013.01); *C12C 7/04* (2013.01); *C12C 7/165* (2013.01); *C12C 7/205* (2013.01); *C12C 7/26* (2013.01); *C12C 11/02* (2013.01)

(58) Field of Classification Search
CPC ........... C12C 7/04; C12C 7/165; C12C 11/02; C12C 13/10; C12C 7/205; C12C 7/26
See application file for complete search history.

(56) References Cited

U.S. PATENT DOCUMENTS 4,347,321 A    8/1982   Lionelle et al.
4,889,041 A  * 12/1989   Mahlich .............. A47J 31/0573
                                                        99/285
(Continued)

FOREIGN PATENT DOCUMENTS

CN    202989138 U    6/2013
CN    203159595 U    8/2013
(Continued)

OTHER PUBLICATIONS

Database WPI Week 201373, Thomson Scientific, London, GB; AN 2013-R96480 XP002771926.
(Continued)

*Primary Examiner* — Dana Ross
*Assistant Examiner* — Kuangyue Chen
(74) *Attorney, Agent, or Firm* — Foley & Lardner LLP; Sunit Talapatra

(57) ABSTRACT

The present invention is in the field of minibreweries and concerns a double-walled vessel for boiling and fermenting wort, comprising (a1) an opening for receiving liquid and yeast, (a2) a space for holding the liquid, (a3) a temperature control element located between outside wall (a5) and inner wall (a6), (a4) an outlet for discharging liquid, equipped with a valve, and a (a9) a controller capable of controlling (a3), which contains a connection (a9') to an operating system. The invention also concerns a system containing or adapted to receive said vessel, a process for brewing beer using said system, kits of parts comprising said vessel and/or system and a program for executing said process.

25 Claims, 1 Drawing Sheet

(51) Int. Cl.
  *C12C 7/165*   (2006.01)
  *C12C 7/20*    (2006.01)
  *C12C 7/26*    (2006.01)
  *C12C 11/02*   (2006.01)

(56) References Cited

U.S. PATENT DOCUMENTS 6,032,571 A      3/2000  Brous et al.
2014/0234482 A1* 8/2014  Kempfert ............... C12C 13/10
                                                            426/16

FOREIGN PATENT DOCUMENTS

DE    33 33 541 A1        4/1985
DE       232 926 A1       2/1986
DE    10 2006 009 612 A1  9/2007
WO    WO 2015/049353 A1   4/2015

OTHER PUBLICATIONS

Database WPI Week 201414, Thomson Scientific, London, GB; AN 2013-V32648 XP002771927.
International Search Report issued in PCT/EP2017/058974, dated Jul. 19, 2017.
Written Opinion of the International Searching Authority issued in PCT/EP2017/058974, dated Jul. 19, 2017.

* cited by examiner

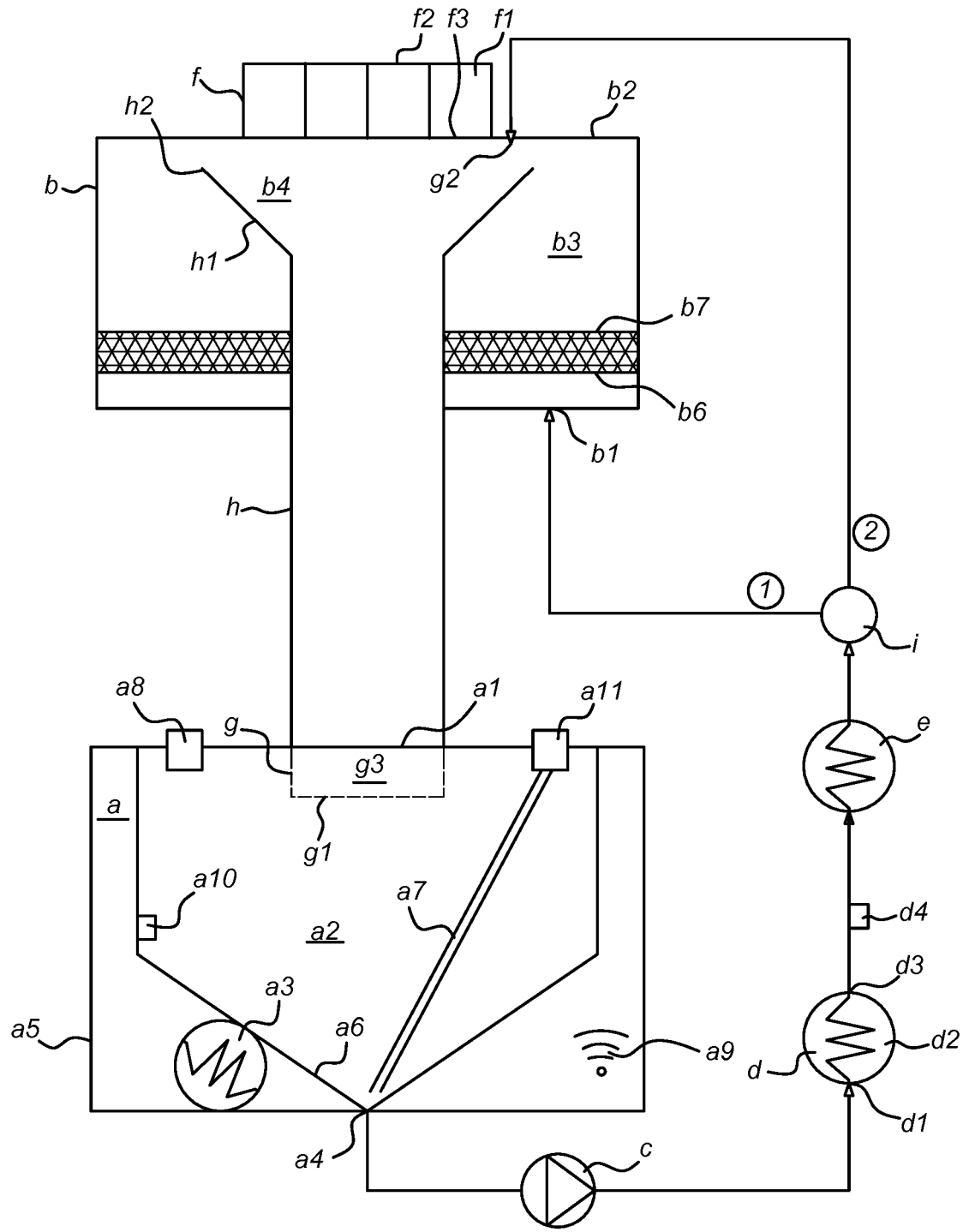

MINIBREWERY

CROSS-REFERENCE TO RELATED APPLICATIONS

This application is the National Phase of International Patent Application No. PCT/EP2017/058974, filed Apr. 13, 2017, published on Oct. 19, 2017 as WO/2017/178607 A1, which claims priority to NL Patent Application No. 2016597, filed Apr. 13, 2016. The contents of these applications are herein incorporated by reference in their entirety.

The present invention relates to the field of beer brewing, in particular to a process and apparatus for the brewing of beer on a small scale. The present process and apparatus is thus highly suitable for home-brewing applications, in which small-scale brewers easily brew their own beer.

BACKGROUND

Home brewing of beers requires a lot of effort, equipment and time. To facilitate this process, minibreweries have been developed. A minibrewery is a household appliance that facilitates the brewing of beer by automating (part of) this process. Minibreweries are known from DE 3333541, U.S. Pat. No. 6,032,571, as well as the commercially available minibreweries Brewie, Picobrew, Brewbot, Braumeister and Artbrew. These known minibreweries all suffer from one or more drawbacks. One of them is that conventional microbreweries basically prepare wort and the fermentation step(s) of the brewing process are not automated, while the microbrewery according to the present invention controls all steps including fermentation, and thus truly prepares beer in a ready-to-tap vessel. The drawbacks of existing systems are elegantly resolved with the detachable vessel according to the present invention.

SUMMARY OF THE INVENTION

The inventors have been able to recreate the large-scale industrial brewing processes in a small-scale household apparatus. The herewith obtained similarity with the true brewing process as well as versatility of the brewing process is unprecedented in the art. The invention thus relates to an improved minibrewery and an improved process for brewing beer at small scale. In the art, several attempts have been made to down-scale the beer brewing process to enable domestic brewing. All known systems and apparatus in this respect, as described above, suffer from several drawbacks, the most important of which is that they are only capable of producing wort, and omit the final step of making the actual beer. As such, additional acts are required by the user of the prior art minibreweries to convert the wort into beer, as well as the need for further equipment.

In a first aspect, the invention concerns a vessel for brewing beer. In a second aspect, the invention concerns a system for brewing beer. In a third aspect, the invention concerns a process for brewing beer. The vessel according to the invention is connectable to the system of the invention. When the vessel is connected to the system, the entire apparatus is the minibrewery which is capable of brewing beer. The apparatus with or without the vessel connected is referred to as the "system".

The process, system and vessel according to the invention all concern an improved minibrewery, wherein at one hand the number of points at which the user can influence the course of the process is maximized, but at the same time the amount of actions to be performed by the user is minimized. The brewing process according to the invention is highly tuneable to satisfy the needs or desires of the user, as the various parameters (e.g. time and temperature of different steps) are controllable by the user. The invention also reduces the number of actions the user has to perform during the brewing process, such that the user can set all parameters to their desired value at the beginning of the process, after which the system automatically performs most steps of the brewing process and the requirement for further interference of the user is minimized.

A further major advantage of the present minibrewery is that it is capable of producing beer, not merely wort. Known minibreweries produce wort, which has to be converted into beer by the user, which requires additional actions, equipment and space needed to complete the brewing process. With the present minibrewery, the production of ready-to-drink beer has become possible in a single apparatus. Most importantly, the beer that is produced with the present minibrewery outperforms the beer produced with prior art minibreweries in terms of quality. The inventors have been able with the present minibrewery to brew beer of identical quality as obtained by professional breweries, which is unprecedented in the art of small scale home brewing devices. The versatility of the present system enables the production of not only a wide variety of beers, but also beers of the highest possible quality, which is not possible with prior art minibreweries.

DETAILED DESCRIPTION

The present invention relates to an improved minibrewery, i.e. the system according to the invention, as well as a vessel that may be used in the system according to the invention, and an improved process for brewing beer at small scale. The minibrewery according to the invention is an apparatus for the batch-wise brewing beer at small scale. The volume of the apparatus and of the batch of beer produced therewith is not limited, although typically small scale brewing is intended. In the context of the present invention, "small scale" refers to batches of at most 100 L, such as 0.5-50 L, preferably 1-25 L, most preferably 2-10 L. For household applications, the volume of a batch is preferably at most 10 L, such as 1-10 L, most preferably 2-8 L, although for other applications, such as semi-professional or professional applications, larger batches may also be envisioned. A typical batch of beer that is produced by the present system or process has a volume of about 5 L. It should be noted that the volumes defined herein relate to the volume of the final beer that is produced by the present system or process. The amount of water introduced in the system may be greater.

Several features of the present minibrewery constitute a marked improvement over prior art minibreweries, that taken together enable the production of beer in a single apparatus with optimal similarity with large-scale processes. Moreover, users of the minibrewery according to the invention have optimal and unprecedented flexibility in terms of adjusting the parameters at which the brewing process is executed, but at the same time the number of manual acts that need to be carried out by the user is reduced to a minimum. For example, mashing, boiling and cooling of the wort, fermenting and serving of the beer is achieved in a single system, without the need of transferring any liquid by the user.

Throughout the process according to the invention, many parameters may be controlled or adjusted by the user, as such providing optimal flexibility in the brewing process even at such small scale. Only with such optimal flexibility, the minibrewery according to the invention does justice to the great variety of beers that are known. As such, the user is capable of tuning the beer brewing process to such an extent that any type of beer may be produced, to the exact liking of the consumer. The present minibrewery provides a greatly increased flexibility compared to prior art minibreweries, such that the greatest variety of beers may be produced. Parameters that may be controlled by the user include: (i) the volume of the mash water, (ii) the mash-in temperature, (iii) whether or not a mash-in period is applied, (iv) the duration of the mash-in period, (v) the entire mash trajectory, including (v-1) the initial mash temperature, (v-2) the type of temperature increase (gradual or stepwise), (v-3) the type of gradual temperature increase (linear, exponential, logarithmic), (v-4) the amount of stepwise increases of the mash temperature, (v-5) the duration of each of the enzyme breaks at a certain mash temperature, (v-6) each of the intermediate mash temperatures, (v-7) the total duration of the mash period, and (v-8) the final mash temperature, (vi) whether or not a mash-out period is applied, (vii) the mash-out temperature, (viii) the duration of the mash-out period, (ix) the amount of hops and/or flavourings batches that are introduced to the boiling wort, (x) the point in time of the introduction of each batch of hops, (xi) the total duration of the boiling stage, (xii) the boiling temperature or trajectory, (xiii) the final temperature of cooled wort, (xiv) the fermentation temperature, (xv) the fermentation duration, (xvi) the serving temperature and (xvii) the heating rate at which the wort is heated. These parameters are referred to as the controllable parameters, as they can be controlled by the user.

However, the system according to the invention is highly versatile, such that also inexperienced users can readily prepare beer. In this respect, a recipe may be loaded into the operating system, wherein all these controllable parameters are pre-set. The operating system then controls the various process in the system during operation, based on these pre-set values. Advantageously, the recipe is based on the specific ingredients that are used and/or the specific (type of) beer that is desired to be brewed. In one embodiment, the recipe is loaded into the operating system by scanning of a code, e.g. a smart code, which may be present on the package of the ingredients.

In one embodiment, the system is self-learning. The operating system may collect data of the brewing process of many different users of many different minibreweries according to the invention. These data can be stored in the operating system or a database connected thereto, such that the operating system of any minibrewery according to the invention is configured to access these data and able to adjust the pre-set controllable parameters based on the results of previous brews. As such, the controllable parameters are tuned to the most optimal brewing conditions without the need of interference of the user. For the user, the system according to the invention is thus easily useable but at the same time provides optimal beers. For users who wish to have more control over the brewing process, the controllable parameters may be adjustable to desire, as described above.

Both the vessel according to the invention and the system according to the invention comprise a connection to an operating system. Preferably, the connection is an internet connection, most preferably a wireless connection. The operating system is able to control the functioning of the system of the invention, both in case the vessel is connected to the system, as well as the functioning of the vessel in stand-alone mode. Both the vessel and system typically comprise a programmable controller device, e.g. a printed circuit board, equipped with a processing unit capable of processing instructions and of controlling all electronic components, including temperature control element (a3), pump (c), heater (d), cooler (e), flow control unit (i). Typically, the vessel contains such a programmable controller device (a9) equipped with a processing unit capable of processing instructions and of controlling all electronic components comprised in the vessel, such as temperature control element (a3). Typically, the system (i.e. excluding the vessel) contains such a programmable controller device (k) equipped with a processing unit capable of processing instructions and of controlling all electronic components comprised in the system (i.e. excluding the vessel), such as pump (c), heater (d), cooler (e), flow control unit (i). The operating system is configured to control the programmable controller device(s). The operating system may contain various recipes, wherein the user can input the ingredients used, and the operating system provides standard values for some or all of the controllable parameters, to reduce the amount and detail of the input needed from the user. These values are referred to as predetermined values. Alternatively, the user can tune each and every of the controllable parameters to obtain the most optimal beer according to his or her liking, which is ideal for experienced users. As such, both beginning home brewers as well as experienced brewers can optimally use the minibrewery according to the invention. In the context of the present invention, "pre-set values" refer to values of the controllable parameters that are either set by the user or provided as predetermined value by the operating system.

Typically, the values for these parameters are entered on an input device. Such an input device may be a screen (touch screen or screen with input means) with a software program on the system itself, or may be a connection to a mobile device such as a smartphone, tablet or computer, containing an application (app) or software program. The connection may be any type of connection known in the art, e.g. wired or wireless. Preferably, the connection is wireless and the system comprises a wireless access point (e.g. connection (a9') and (k')). Most preferably, Wi-Fi is used as connection. The app or software program enables the user to input the values of all parameters to his desire, and the system will automatically adopt the values as inputted in the beer brewing process. To guide the user, certain parameters may be predetermined to a certain value which may or may not be overruled by the skilled person and/or a range may be provided in which the user may adjust the value of the parameters. Implementing such predetermined ranges is also beneficial for the safety of the system, such that for example the mash-in temperature cannot be set too high that the temperature within the system rises undesirably, e.g. above the boiling point. In one embodiment, the system is programmed with predetermined values for one or more, preferably all of, the controllable parameters that may be overruled by the used, and/or with predetermined ranges for one or more, preferably all of, the controllable parameters that may not be overruled by the user. Typical values for the predetermined ranges and predetermined values are provided throughout the description.

In addition to the controllable parameters, further flexibility comes from selection of the type of malt used for the grist, the extent of milling of the malt, the amount of grist used in the grist bed, the type of hops, the amount of different types of hops and other ingredients used.

Apparatus

In a first aspect, the invention concerns a vessel for brewing beer, and in a second aspect a system comprising the vessel according to the invention. Herein, "apparatus" and "system" are used interchangeably.

Vessel

The vessel according to the first aspect is a double-walled vessel for boiling and fermenting wort, comprising:
(a1) an opening for receiving liquid and yeast
(a2) a space for holding the liquid;
(a3) a temperature control element located between outside wall (a5) and inner wall (a6);
(a4) an outlet for discharging liquid, equipped with a valve; and
(a9) a controller capable of controlling (a3), which contains a connection (a9') to an operating system.

The vessel according to the invention is suitable for brewing beer, in particular for boiling of wort, fermenting of the wort and for holding and drawing the beer. The vessel according to the invention is thus suitable as copper (or boiling tank) and as fermentation tank in the brewing of beer, and as keg for holding and drawing the beer. When incorporated into the system according to the invention, the vessel may also be used as reservoir for water or wort. Lastly, the vessel is equipped with means for drawing beer from the vessel. In one embodiment, the vessel is detachable from the system according to the invention. When connected to the system, the vessel may contain liquid at various stages of the brewing process according to the invention, such as water, wort and beer. The vessel according to the invention is ideally suited to be used in the system according to the invention, as described further below. The vessel according to the invention may also be referred to as a detachable vessel or as a vessel being detachable from the system according to the invention.

The vessel according to the invention comprises (a1) an opening for receiving liquid and brewing yeast, a space (a2) for holding the liquid, a temperature control element (a3), an outlet (a4) for discharging liquid. The inside volume of the vessel, i.e. the volume of space (a2) is preferably in the range of 0.5-25 L, more preferably 1-15 L, even more preferably 3-10 L, most preferably 5-8 L.

The vessel is at least partly double-walled and comprises an outside wall (a5) and an inside wall (a6), such that the outside shape may be different from the inside shape. The outside shape of the vessel is typically cylindrical, while the inside shape, i.e. space (a2), has a cylindrical top part and a conical bottom part having a downward pointing apex, to assist settling of the yeast during and upon completion of the fermentation step. Temperature control element (a3) may then conveniently be positioned between the two walls. Temperature control element (a3) typically contains a thermally conductive path in contact with the liquid inside space (a2), preferably with inside wall (a6). The cooling element is thus protected from outside stimuli and less prone to breakdown.

The opening (a1) for receiving liquid and brewing yeast has many purposes. It allows the user to pour water into the vessel at the start of the brewing process, in which case vessel (a) acts as a water reservoir. During mashing, it allows the flow of liquid from the grist chamber (a) through the vessel and heater (d) to heat the mash water. During boiling, it allows the flow of liquid from the heater (d) to heat the wort, during which the vessel acts as a copper or kettle. At the start of fermenting, opening (a1) allows the user to add yeast into the vessel, in which case vessel (a) acts as a fermenter. After the fermentation is completed, opening (a1) can be used to attach a beer tap to draw beer from the vessel, in which case vessel (a) acts as a keg. It is however preferred that the beer tap is attached to a separate outlet in the top of vessel (a).

Opening (a1) may be a single opening or two separate openings, one for receiving liquid and one for receiving yeast. Preferably, there is a single opening for receiving both liquid and brewing yeast. Opening (a1) preferably takes the form of a hole in the top of the vessel, which is large enough for a user to pour water or yeast through the opening into the vessel, typically in the range of 0.5-25 cm, preferably 1-10 cm. The opening (a1) is preferably located substantially in the middle of the top of the vessel, such as at the midpoint of a vessel with a circular cross-section. Opening (a1) is typically located at the top side of the vessel, such that liquid readily flows from the grist chamber to the vessel using gravity. When connected to the remainder of the system, liquid (e.g. mash) is capable of flowing from the grist chamber to the vessel through opening (a1). The fluid connection between grist chamber (b) and the vessel typically takes the form of an overflow. Thus, when the liquid within the grist chamber rises to a certain level, it will flow from the grist chamber into the vessel though the opening, for example by a funnel located in the grist chamber that directs the liquid through opening (a1) into the vessel. In one embodiment, opening (a1) is equipped with means to connect a beer tap. Opening (a1) may be equipped with a hatch which is moveable between an open position and a closed position. In open position, the user of the system is capable of providing water to space (a2). When the vessel is connected to the remainder of the system, the hatch is typically in open position, while the hatch is typically in closed position when the vessel is in stand-alone mode. In closed position, the hatch is preferably liquid-tight and air-tight, to avoid leakage of water and steam. Advantageously, also the leakage of $CO_2$ is prevented such that pressure can build up within the system.

Temperature control element (a3) is mainly used to keep the wort during fermentation at the desired temperature. For most beers, this desired temperature is below ambient, such that element (a3) is preferably a cooling element. In a most preferred embodiment, element (a3) is a Peltier element. Peltier elements are particularly convenient to be used in the vessel according to the invention, as they do not contain any moving parts. In view of the detachable and portable nature of the vessel, element (a3) should not be fragile and prone to breakdown. Moreover, a Peltier element is ideally suited to keep the temperature at a temperature in the range of 6-20° C. which is mostly used for fermentation. Lastly, a Peltier element can be manufactured such that it does not take up too much space, such that not too much of the content of space (a2) is used. The vessel, in particular element (a3), is typically equipped with a power source, such as a plug for a wall socket and/or a battery pack, in order to provide power to element (a3). In addition, a Peltier element could be used as a cooling element as well as a heating element, such that optimal control of the fermentation temperature within the vessel is possible. The vessel is typically equipped with a temperature sensor (a10) to monitor the temperature of the liquid within the vessel. There may be one or more temperature sensors (a10) provide, most preferably two sensors are provided at opposite ends of the vessel, such that the temperature can be monitored throughout the entire vessel.

Outlet (a4) is for discharging liquid. In one embodiment, outlet (a4) may also be used to discharge spent yeast, although a separate outlet may be implement to that end or a riser (a7) may be used as described below. In one embodiment, outlet (a4) is used to pitch yeast for fermenting the boiled wort. Outlet (a4) is preferably located at the apex of the conical bottom part of space (a2). Being located at the bottom, liquid is easily discharged from the vessel by opening the tap. Outlet (a4) may the form of a tap or valve at the bottom of the vessel, or outlet may take the form of a connection which "open" (i.e. liquid is able to flow through without problem) when the vessel (a) is connected to the remainder of the system, and "closed" (i.e. liquid is not able to flow through) when the vessel is detached from the system. Such connections are known in the art. Conveniently, outlet (a4) contains a connection for a ball valve, also referred to as trub container. A trub container is a container of small volume, typically 0.0001-0.1 times, preferably 0.01-0.05 times, the volume of space (a2), and can be used by the user to add components such as yeast to the wort and/or to remove small volumes of liquid, typically containing settled solids (e.g. spent yeast), from the system.

In view of the conical form, spent yeast accumulates at the apex of the cone in the form of a sedimentation (suspension). This suspension of spent yeast in liquid is readily removed from the vessel by drawing a few millilitres of liquid that contains the spent yeast, from the bottom, preferably from the apex, of space (a2). The remaining liquid is then removed afterwards by opening the tap (again). Alternatively and preferably, the vessel is equipped with a riser (a7), located within space (a2), which contains a bottom inlet at or near the bottom of the vessel, preferably at the apex of the conical bottom part, and a top outlet at the top of the vessel. The outlet of the riser may be located at opening (a1), although it is preferred that a separate outlet (a11) is provided which is connected to the top outlet of the riser. Riser (a7) is conveniently used to draw a few millilitres of spent yeast, in the form of a suspension, from the bottom of the vessel. A ball valve as described below may conveniently be used to that end. In case water, mash or wort is discharged from the vessel, this preferably occurs through outlet (a4) in the form of a tap at the bottom of the vessel, while beer being discharged from the vessel preferably occurs through riser (a7) connected to a detachable beer tap. Riser (a7) or outlet (a4) could, if desired, also be used to remove small hops particles from the wort after the boiling and prior to the addition of yeast, much like the spent yeast is removed after the fermentation step. However, in view of the sieve used to hold the hops, the amount of hops particles present in the wort at the end of the boiling step is minimal and does not interfere with the fermentation. Thus, removal thereof from the wort, e.g. by filtration, is not required and minimizes the user's acts needed to operate the system according to the invention. In case sieve (g) would be located within space (a2), it may be required to remove the sieve from the vessel in order to avoid further contact between the wort and spent hops during fermentation. Such removal of the sieve is typically part of disconnecting the vessel from the remainder of the system, after which the vessel continues the brewing process in stand-alone mode.

The use of detachable or removable beer taps on small-scale beer vessels or kegs is known in the art and any type and configuration thereof can be used in the context of the present invention. Detachable beer tap may be connected via opening (a1) or via a separate outlet in the top part of vessel (a). Preferably, a separate outlet (a11) is provided for attaching the beer tap as such outlet are typically not suitable for providing water and yeast. Typically, means especially present for such connection, such as a screw thread or a NC coupling, are provided at the outlet, to enable connecting the beer tap to the vessel, for drawing beer directly from the bottom of the vessel, without the need of transferring liquid, such as wort or beer, from the vessel to a separate container (e.g. keg or bottles) for storage and consumption. Vessel (a) or the detachable beer tap contains a connection (a8) for connecting a carbon dioxide cartridge. Preferably, such a connection is present on the vessel, preferably at the top of the vessel. Such a cartridge is typically installed after completion of the fermentation step in order to (further) carbonate the beer and to build up pressure within the keg to enable facile drawing of the beer. Such use of a carbon dioxide cartridge is known in the art.

Vessel (a) further comprises a controller (a9), which is capable of controlling at least (a3). Typically, the controller is connected to (a3) and typically to any of the sensors that are preferably present, such as temperature sensor (a10). Such a connection is typically a wired connection, as known in the art. Controller (a9) further contains a connection (a9') to an operating system. Connection (a9') typically takes the form of an internet connection, preferably a wireless connection. Controller (a9) is preferably a printed circuit board (PCB), which is wired to the electronic components of vessel (a), such as element (a3) and sensor (a10). Instructions for operating the vessel, in particular during the fermentation step in stand-alone mode, may be received via connection (a9') from an operating system, typically an online operating system. Such an online operating system enables easy access by the user to control and govern parameters of the beer brewing process, such as for example the temperature at which the fermentation step is performed, via the operating system. In one embodiment, the user can access the operating system to control the brewing process via a mobile or web-based application. Controller (a9) is preferably capable of retrieving information form the operating system to operate the vessel (a), in particular temperature control element (a3) and to send information from the vessel (a), in particular from a sensor, e.g. temperature sensor (a10), to the operating system, which information may as such be presented to the user to provide current information of the brewing process. Such sending and receiving of information is accomplished by means of connection (a9'). Thus, controller (a9) and connection (a9') enable control of the brewing process by the operating system even if the vessel (a) is in stand-alone mode, such as may be the case during fermentation. As such, the brewing process is automated to a greater extent as in known minibreweries and the present minibrewery is capable of producing beer, and not just wort.

Vessel (a) may further comprise one or more sensors, such as a temperature sensor (a10), turbidity sensor, a pressure sensor, a bubble counter and/or a platometer, preferably a temperature sensor (a10), turbidity sensor, a bubble counter and/or a platometer. Preferably, at least a temperature sensor (a10) is present located within space (a2). As such, the temperature of the liquid within the vessel can be measured, which is especially beneficial during fermentation in stand-alone mode, i.e. not connected to the remainder of the system. The temperature measurement may be used to control temperature control element (a3) to keep the temperature on the desired level. A vibration sensor is suitable to determine the amount of gaseous bubbles that are formed during fermentation (a bubble counter) and is thus able to determine when the fermentation step is finished. Alternatively, a manual bubble counter is installed, such that the user of the system can count how much bubbles are formed during a specific period of time. At a certain amount of gas evolving from the liquid, the fermentation is completed, which is conveniently determined by a bubble counter. Platometers are known in the field of brewing beer and used to determine the sugar content of the wort.

The vessel is advantageously designed such that it is detachable from the system according to the invention. Thus, in one embodiment, the vessel is equipped with means to connect it to the remainder of the system according to the invention. Such detachable connections are preferably integrated at least at outlet (a4), which is in connection with pump (c) when the vessel is connected to the system. Moreover, it is preferred that the vessel is equipped with means for carrying, such as a handle. The detachable nature of the vessel provides a great advantage, as the system can be used for a second run of the brewing process while the beer of the first run is fermenting and stored prior to consumption, while only replacement of the vessel is needed. As fermentation is typically the most time consuming step in the brewing process, the usage of the system according to the invention is greatly improved over systems that require (controlled) fermentation within the system. On the other hand, transfer of a liquid to a separate fermentation tank is not needed, eliminating incidences of contamination and spoilage and reducing the number of manual acts that need to be performed by the user.

The vessel according to the invention is a key element in the system according to the invention. When connected to the system according to the invention, the minibrewery according to the invention is formed. The vessel is detachable from the system. In other words, the system is adopted to receive the vessel according to the invention.

The invention also concerns a kit of parts, comprising at least one vessel according to the invention, such as 1-10 vessels, and at least one detachable beer tap configured to be attachable to the vessel via opening (a1). The kit of parts may further comprise one or more carbon dioxide cartridges. The kit of parts is typically defined by a visible connection and/or is provided in a single package. Preferably, the kit of parts is provided in a single package, e.g. box or wrapper.

System

The system according to the second aspect is a system for batch-wise brewing of beer, containing or adapted to receive the vessel (a) according to the invention, wherein the system comprises:
(b) a grist chamber, comprising:
  (b1) an inlet for receiving liquid;
  (b2) an entry for receiving grist;
  (b3) a space for holding a grist bed;
  (b4) an outlet for discharging liquid,
  wherein inlet (b1) and outlet (b4) are located at opposite ends of space (b3);
(c) a pump;
(d) a heater;
(e) a cooler;
(f) a hops dispenser, comprising:
  (f1) at least one hops chamber;
  (f2) an entry for receiving hops;
  (f3) means for transferring the hops from chamber (f1) to sieve (g),
(g) a sieve, comprising
  (g1) a sieving membrane capable of retaining hops and permeating liquid;
  (g2) an inlet for receiving liquid;
  (g3) a space for holding hops, and
(i) a flow control unit capable of switching between a first position, that allows flow of liquid from vessel (a) to grist chamber (b), and a second position, that allows flow of liquid from vessel (a) to sieve (g).

Herein, when the vessel (a) is contained in the system, outlet (b4) is in fluid connection with inlet (a1), outlet (a4) is in fluid connection with flow control unit (i), flow control unit (i) is in fluid connection with inlet (b1) and with inlet (g2), and permeate side of membrane (g1) is in fluid connection with space (a2). When the vessel (a) is not contained in the system, flow control unit (i) is in fluid connection with inlet (b1) and with inlet (g2), and permeate side of membrane (g1) is in fluid connection with space (a2), and the system is typically configured as such that when the vessel is received by the system, outlet (b4) is in fluid connection with inlet (a1) and outlet (a4) is in fluid connection with flow control unit (i).

The system according to the invention is for small scale brewing of beer, and may also be referred to as "minibrewery", "brewing system", "brewing device" or "home brewing device". The system comprises a grist chamber (b), a pump (c), a heater (d), a cooler (e), a hops dispenser (f), a sieve (g) and a flow control unit (i). In addition, the system contains the vessel (a) according to the invention or is adapted to receive the vessel (a) according to the invention. In a preferred embodiment, the system according to the invention contains the vessel (a) according to the invention. In a preferred embodiment, the system according to the invention further comprises a splitter (j). The system according to the invention typically contains a housing wherein pump (c), heater (d), cooler (e) and flow control unit (i) are located, as well as the majority of the piping that connects the various elements. As such, these elements are protected from outside stimuli that could lead to breakage.

In addition to connection (a9') to the operating system provided in vessel (a), the system preferably contains a further connection (k') to the operating system. As such, when the vessel is disconnected from the system, both the system and the vessel remain connected to the operating system that controls the operation of both the system and the vessel, to effectuate the most optimal and efficient production of beer. Connection (k') is typically part of an electric circuit, wherein a controller (k) is wired to the electronic components of the system, such as pump (c), heater (d), cooler (e), dispenser (f) and flow control unit (i). Use of a controller and electric wiring to operate a system is known in the art. Controller (k) typically comes in the form of a printed circuit board. Connection (k') typically takes the form of an internet connection, preferably a wireless connection. Controller (k) is preferably capable of retrieving information form the operating system to operate the system, in particular pump (c), heater (d), cooler (e), dispenser (f) and flow control unit (i) and to send information from the vessel (a), in particular from any of the sensors that are preferably present, to the operating system, which information may as such be presented to the user to provide current information of the brewing process. Such sending and receiving of information is accomplished by means of connection (k').

In one embodiment, the system according to the invention comprises a clean-in-place (CIP) system. The CIP system contains piping towards and from a reservoir which is designed to receive and hold a cleaning agent. The CIP system should be connected to the remainder of the system such the pump (c) is capable of pumping liquid through the piping and the reservoir of the CIP system as well as through the remainder of the system, such that the cleaning agent is spread throughout the entire system.

Grist Chamber (b)

The grist chamber (b) comprises an inlet (b1) for receiving liquid, an entry (b2) for receiving grist, a space (b3) for holding a grist bed, an outlet (b4) for discharging liquid, wherein inlet (b1) and outlet (b4) are located at opposite ends of space (b3). Preferably, inlet (b1) is located in the bottom of the grist chamber and outlet (b2) is located in the top of the grist chamber. The skilled person appreciates that the desired porosity of the filter depends on the type of pump used. The filter is capable of retaining particles that would otherwise interfere with smooth operation of the pump (c). Entry (b2) typically takes the form of a hatch, which is moveable between an open position and a closed position, or removable top cover. In open position, the user of the system is capable of providing the grist to space (b3) to provide a grist bed. When the system is in use, the hatch is in closed position. In closed position, the hatch is preferably liquid-tight and air-tight, to avoid leakage of mash water and steam. Alternatively, the hatch may be provided with an opening, through which the user may add additional water to the system if needed, when the system is in use. This could advantageously be used to rinse the grist bed after mashing to collect as much as possible of the sugars in the wort. The hatch may contain means to remove steam from the system, such as a steam vent. Outlet (b4) typically takes the form of an overflow, such that when the liquid level in the grist bed reaches a certain level, the liquid will automatically flow to the vessel (a).

The grist bed is typically provided in the bottom part of space (b3), and may be placed between two grids, which are permeable by liquid and solutes but not by (the majority) of the grist bed particles. The grist bed may then be placed on top of the bottom grid (b6), while top grid (b7) is placed on top of the grist bed after placement of the grist bed in space (b3). Preferably, at least the top grid (b7) is removable from the grist chamber, such that the user can place the grist bed on top of the bottom grid (b6) and subsequently fix the grist bed in position by placing the top grid (b7) on top of the grist bed. In one embodiment, the bottom grid (b6) is also removable from the grist chamber, to facilitate cleaning. Preferably, bottom grid (b6) is placed slightly above the bottom of the grist chamber (b) such that there is some space for the liquid, when entering via inlet (b2) in the bottom of the grist chamber (b), before penetrating the grist bed.

In a preferred embodiment, the grist chamber as a whole is detachable from the system. Typically, the piping to and from the grist bed remain in the housing, while the grist chamber (b) itself may be taken out. In one embodiment, the grist chamber (b) is cylindrical. In one embodiment, the outside of the grist chamber (b) is made of transparent material, typically glass or plastic material. The inner volume of the grist chamber (b), i.e. the volume of space (b3), is preferably in the range of 0.1-5 L, more preferably 0.5-2 L.

When the system is ready for use or in use, outlet (b4) is in fluid connection with opening (a1) of vessel (a), and flow control unit (i) is in fluid connection with inlet (b1). The fluid connection between outlet (b4) and inlet (a1) typically takes the form a downpipe (h), through which the liquid drops from grist chamber (b) to vessel (a). The top part of the downpipe (h) preferably has the form of a funnel (h1), which is placed in the centre of space (b3). The upper rim (h2) of the downpipe (h), preferably of the funnel, is the overflow outlet (b4). The bottom part of the downpipe (h) is connected to opening (a1) of vessel (a), when vessel (a) is connected to the system. Preferably, the bottom part of downpipe (h) extends into the interior of vessel (a), i.e. into space (a3), to minimize the chance on spilling when liquid is transferred from grist chamber (b) to vessel (a). When the system is in use, it is preferred that the connection between (h) and (a1) is liquid-tight and air-tight, to avoid leakage of liquid or steam into the housing of the system. It is thus preferred that opening (a1) is provided with a rubber ring that tightly fits around the bottom part of downpipe (h) that extends into space (a3). Any excess steam may for example leave the system via a steam vent or opening provided in the hatch of the grist chamber.

In one aspect, the invention concerns the grist chamber (b) as described herein, which is preferably adapted for use in a minibrewery, most preferably for use in the minibrewery according to the invention.

Vessel (a), Pump (c) and Heater (d)

The vessel (a) is used as mash reservoir during mashing, as copper (kettle) for boiling the wort in the presence of hops, as fermenter for fermenting the wort and as keg for holding the beer before drawing. Vessel (a) is the vessel according to the invention as described above, and contains an opening (a1) for receiving liquid and brewing yeast (i.e. an inlet), a space (a2) for holding the liquid, a temperature control element (a3), an outlet (a4) for discharging liquid and spent yeast. It is preferred that vessel (a) is located below the level of grist chamber (b).

Outlet (b4) of grist chamber (b) is in fluid connection with inlet (a1), preferably via a downpipe (h) as defined above. Outlet (a4) is in fluid connection with inlet (b1) of the grist chamber (b) via flow control unit (i). Flow control unit (i) is configured to receive liquid from outlet (a4) and either discharge liquid to inlet (b1) of the grist chamber (b) or to sieve (g). To effectuate the circulation of liquid through vessel (a) and grist chamber (b), i.e. from outlet (a4) to inlet (b1), through the grist bed in space (b3) and from outlet (b4) to inlet (a1), a pump (c) is provided, which is preferably located in the fluid connection between outlet (a4) and inlet (b1), more preferably in the fluid connection between outlet (a4) and flow control unit (i). To effectuate the heating of liquid during the circulation, a heater (d) is provided, which is preferably located in the fluid connection between outlet (a4) and inlet (b1), more preferably in the fluid connection between outlet (a4) and flow control unit (i). Thus, in an especially preferred embodiment, a pump (c) and a heater (d) are provided in the fluid connection between outlet (a4) and inlet (b1), more preferably in the fluid connection between outlet (a4) and flow control unit (i). Most preferably, heater (d) is located upstream of pump (c).

Pump (c) capable of pumping liquid through the system, from vessel (a) to grist chamber (b) or to sieve (g), depending on the position of flow control unit (i). Any type of pump known in the art may be used. The presence of the pump enables the circulation of liquid as defined herein.

Although any heater, preferably electric heater, known in the art can be used, it is preferred that heater (d) is a pipe heater or in-line heater, wherein liquid flows through a pipe in which it is heated to the desired temperature. Water enters the pipe heater through the upstream opening (d1), is heated in the interior (d2) of the pipe heater and leaves the pipe heater through the downstream opening (d3). The heating is preferably controlled by a temperature sensor (d4) located in the pipe heater or just downstream thereof. In a most preferred configuration, sensor (d4) is located in the fluid connection between opening (d3) and flow control unit (i). Such a configuration of a pipe heater is known in the art. The pipe heater is typically configured as a pipe, typically a stainless steel pipe, which is wound with a heating wire. Preferably, the liquid is heated with a rate of 1-10 degrees Celsius per minute, preferably 1.5-5° C./min, most preferably 2-4° C./min.

Cooler (e)

The fluid connection between outlet (a4) and sieve (g), preferably the fluid connection between outlet (a4) and flow control unit (i), is equipped with a cooler (e). Cooler (e) is used to cool the wort after the boiling step within vessel (a) as rapidly as possible. Rapid cooling of the wort provides the most optimal beers. Depending on the type of cooler used, the cooler may contain an inlet (e1) for receiving a cooling medium, typically water, and an outlet (e2) for discharging spent cooling medium, typically water that has been warmed during cooling of the liquid inside the system.

Any type of cooler known in the art to be suitable for cooling liquids may be used as cooler (e). Preferred examples include the use of cooling elements containing e.g. ice, a heat exchanger and an evaporative cooler. When using cooling elements containing ice, favourable results have been obtained wherein the weight ratio of wort to ice is 1-5, preferably 1.2-2. In one embodiment, cooler (e) is a heat exchanger, preferably a plate heat exchanger. The heat exchanger typically operates in countercurrent mode wherein a cooling liquid is used to cool the liquid that flows through the system. Any cooling liquid may be used, such as tap water. The inventors found that using tap water, typically 5-10 L per L liquid to be cooled (wort), the wort can be cooled within 10 min or even within 5 min.

In an alternative embodiment, cooler (e) is an evaporative cooler. Evaporative coolers are known in the art and employ the heat that is needed to evaporate water to cool the wort. Evaporative coolers are particularly beneficial in the system according to the invention, as they require very little water consumption and enable very quick cooling of the boiled wort.

Flow Control Unit (i)

Flow control unit (i) controls the flow of liquid that originates from vessel (a) via outlet (a4) and preferably via a pump (c) and heater (d), to either grist chamber (b), via inlet (b2), or to sieve (g), optionally via splitter (j). Flow control unit (i) is capable of switching between a first position, that allows flow of liquid to grist chamber (b), and a second position, that allows flow of liquid to sieve (g).

Flow control unit (i) typically takes the form of a three-way junction in the piping, wherein the piping from vessel (a) forms one branch (incoming flow), and the piping towards grist chamber (b) and sieve (g) form the other two branches (outgoing flows). The piping of the outgoing flows is typically provided with one or two valves that are controlled by the operating system. Typically, a three-way valve is used, or a first valve (i1) in the piping towards grist chamber (b) and a second valve (i2) in the piping towards sieve (g). As will be appreciated by the skilled person, both configuration lead to the same result of either allowing flow of liquid to grist chamber (b) or allowing flow of liquid to sieve (g). In case two valves are used, both valves (i1) and (i2) are capable of switching between an open position, enabling flow through the valve, and a closed position, disabling flow through the valve. Preferably, flow control unit (i) is configured as such that both valves cannot be open at the same time. When the system is in use, either valve (i1) will be open, allowing flow of liquid from vessel (a) to grist chamber (b), or valve (i2) will be open, allowing flow of liquid from vessel (a) to sieve (g). In case a three-way valve is used, it is capable of switching between a first position, that allows flow of liquid to grist chamber (b), and a second position, that allows flow of liquid to sieve (g).

During mashing-in and mashing, flow control unit (i) ensures that the flow from vessel (a) is led to grist chamber (b), during which heater (d) provides the desired mash-in or mash temperature. In other words, valve (i1) will be open and valve (i2) will be closed, or the three-way valve will be in the first position. During boiling, flow control unit (i) ensures that the flow from vessel (a) is led to sieve (g) and back to vessel (a), during which heater (d) provides the desired boiling temperature. In other words, valve (i1) will be closed and valve (i2) will be open, or the three-way valve will be in the second position. Upon completion of the boiling step, flow control unit (i) ensures that the flow from vessel (a) is led to sieve (g) and back to vessel (a), during which heater (d) is turned off and cooler (e) is turned on to ensure rapid cooling of the wort. In other words, valve (i1) will be closed and valve (i2) will be open, or the three-way valve will be in the second position.

Splitter (j)

In one embodiment, the system comprises a splitter (j) capable of splitting the flow of liquid originating from flow control unit (i) via incoming pipe (j1) into a flow of liquid towards inlet (g2) via outgoing pipe (j2) and a flow of liquid towards vessel (a) via outgoing pipe (j3). In this embodiment, flow control unit (i) is in fluid connection with inlet (b1) and with pipe (j1), pipe (j2) is in fluid connection with inlet (g2), pipe (j3) is in fluid connection with inlet (a1). Splitter (j) is capable of splitting the flow of liquid originating from vessel (a), via outlet (a4), through flow control unit (i), when in the second position, into two flows of liquid. One flow of liquid is led via sieve (g) to vessel (a) and one flow of liquid is led directly to vessel (a), typically to opening (a1), without passing through sieve (g). Splitter (j) typically takes the form of a three-way junction in the piping, wherein the piping from flow control unit (i) forms one branch (incoming pipe (j1)), and the piping to sieve (g) and to vessel (a) form the other two branches (respectively outgoing pipe (j2) and outgoing pipe (j3)). Splitter (j) is not a flow control unit that controls the flows of liquid to a certain destination. Instead, the flow of liquid that enters splitter (j) will always be split in two flows. Splitter (j) is preferably configured as such that 25-75 vol % of the incoming flow from flow control unit (i) is led to sieve (g) and 25-75 vol % of the incoming flow from flow control unit (i) is led directly to vessel (a).

Outgoing pipe (j2) is thus in fluid connection with sieve (g), in particular with inlet (g2) and outgoing pipe (j3) is thus in fluid connection with vessel (a), in particular with opening (a1). In a preferred embodiment, the fluid connection between outgoing pipe (j3) and opening (a1) is configured as such that pipe (j3) debouches into downpipe (h). In a preferred configuration, splitter (j) is implemented above downpipes (h) and (f4), such that outgoing pipe (j2) debouches into downpipe (f4) and outgoing pipe (j3) debouches into downpipe (h). Conveniently, splitter (j) is located in the lid of grist chamber (b) that, when the system is in use, covers the grist chamber and the downpipes located within the grist chamber.

As both outgoing pipe (j2) and outgoing pipe (j3) are in fluid connection with opening (a1), the presence of the splitter during heating of the water to mash-in temperature and cooling of the wort after boiling does not negatively affect the brewing process. However, during boiling of the wort, it is preferred that only part of the wort flows through sieve (g). Hops particles that are present in sieve (g) during boiling may clog holes in the sieving membrane (g1), such that the flow through sieve (g) may become blocked. In the absence of the bypass through pipe (j3) this could lead to unsafe situations wherein pressure is built up in the system and short-circuits may occur. Additionally, the inventors have found the present mode of introducing hops to the boiling wort, provides excellent results in quality of the beer, even when only part of the wort is in direct contact with the hops. Sieve (g) and the hops therein may act as a filter during boiling, such that any precipitates such as denatured protein are conveniently removed from the wort, which does not require further filtering and the precipitates do not interfere with the functioning of pump (c).

The presence of such a bypass was however found not to be crucial for the proper functioning of the system. The skilled person will appreciate that sieving membrane (g1) may be selected as such that blocking by hops particles hardly occurs. Alternatively, same effect of avoiding potential unsafe situations can be achieved when splitter (j) is not comprised in the system. In one embodiment, which is particularly relevant for the process according to the invention, the batches of hops are received by sieve (g) in individual sachets of hops. Herein, the sachets are made of porous material which is capable of permeating liquid (water, wort), and retaining the hops particles. In case hops particles would clog the membrane holes, they would do so of the sachets and not of membrane (g1), such that an unobstructed flow of wort remains possible.

Hops Dispenser (f) and Sieve (g)

Hops dispenser (f) comprises at least one hops chamber (f1), located above vessel (a), for holding a batch of hops, an entry (f2) for receiving hops to the at least one hops chamber (f1), means (f3) for transferring the hops from chamber (f1) to sieve (g). The hops can be entered by the user into the hops chamber (f1) through entry (f2). Suitable entries include a removable cover, a door, a hatch, a shutter and an opening. Hops are typically transferred via a downpipe (f4) to sieve (g). Downpipe (f4) extends downwards from hops dispenser (f) towards sieve (g). The lower opening of downpipe (f4) opens into the space (g3) above the sieving membrane (g1). In a preferred embodiment, downpipe (f4) and downpipe (h) are a single downpipe through which both liquid, from grist chamber (b) to vessel (a), as well as hops, from dispenser (f) to sieve (g), are transferred.

Means (f3) ensure that the one or more batches of hops are introduced to the boiling wort at the appropriate point in time. Means (f3) are operated by the operating system that controls the entire system. Examples of means (f3) include a pusher which pushes the hops through a hole in the bottom of chamber (f1) into downpipe (f4), and a hatch or shutter moveable between a closed and an open position. The hatch in closed position forms (part of) the bottom of (f1), upon which the hops lie, and in open position the hatch opens and the hops fall into downpipe (f4).

Preferably, the hops dispenser comprises 1-10, more preferably 2-8, most preferably 3-6 hops chambers. The system can be operated with a single downpipe, which is used by all of the hops chambers, although each hops chamber may have a separate downpipe. Here, some exemplary configurations of the hops dispenser with multiple hops chambers are described. A first possibility is an array of adjacent hops chambers, each with a separate downpipe. Most preferably, a circular hops dispenser is used, which comprises walls, that radially extend from the midpoint to the periphery of the circle, forming the boundary between wedge-shaped hops chambers. Such a configuration may also be referred to as a "carrousel". Each of these chambers may have a separate downpipe, but preferably a single downpipe is provided in which each of the hops chambers may drop the hops contained therein at the appropriate point in time. Each chamber (f1) may contain a hatch as means (f3) that opens into a funnel-shaped upper part (f6) of the downward extending downpipe (f4). The lower part of the downpipe (f4) is formed by the stem of the funnel, which extends to space (g3). Alternatively, means (f3) contains a single hatch provided in the bottom of one of the wedge-shaped chambers, and the radially extending walls separating the hops chambers are rotatable around a central axis, together forming a rotatable unit. After the first hops chamber has been emptied into downpipe (f4), the rotatable unit rotates by about the same amount of degrees as the size of the apex of the wedge-shaped hops chamber, such that a second hops chamber is shifted above the hatch. To empty all hops chambers, the number or rotations equals the number of hops chambers minus one. Typically, 2, 3, 4, 5 or 6 equally-sized hops chambers are present, corresponding to apexes and rotations of 180°, 120°, 90°, 72° and 60° respectively.

Preferably, the entire hops dispenser (f), is removable from the system. As such, the hops dispenser and the entire system is easily cleaned form spent hops after a batch of beer has been brewed. Also, cleaning of the system is facilitated as such.

The downpipe (f4) opens in space (g3) of sieve (g). Sieve (g) contains a sieving membrane (g1) which contains holes or apertures allowing the passage of liquid from space (g3) to space (a2) of vessel (a) and an inlet (g2) for receiving liquid from flow control unit (i) in the second position. Flow control unit (i) is thus in fluid connection with inlet (g2). Membrane (g1) forms (part of) the bottom of space (g3) and may be a flat (two-dimensional) membrane (e.g. a stainless steel sieve) or take the form of a sachet, bowl or bucket in which the hops fall. Space (g3), located above membrane (g1), may also be referred to as the retentate side of membrane (g1), while the space below membrane (g1) may be referred to as the permeate side of membrane (g1). The permeate side of membrane (g1) is in fluid connection with space (a2) of vessel (a), typically via opening (a1), such that liquid is capable of flowing from space (g3) to vessel (a). The membrane (g1) is not permeable for the hops that are received from hops dispenser (f). As such, the hops, when located in (g3), are in direct contact with the liquid, i.e. the boiling wort that circulates through vessel (a), pump (c), heater (d), flow control unit (i) and sieve (g), but the hops particles are not capable of entering the flow of liquid and will thus not hamper smooth operation of pump (c). Sieve (g) may be located above the level of opening (a1), at the level of opening (a1) or even below the level of opening (a1), i.e. within space (a2). In the latter configuration, liquid that is received by opening (a1) flows through sieving membrane (g1) before it can be discharged via outlet (a4).

In one configuration, downpipe (f4) extends downwards in the interior of downpipe (h) as two concentric cylinders, wherein downpipe (f4) has a smaller diameter compared to downpipe (h). Hops are thus received by sieve (g) through the central downpipe (f4) and liquid that flows from grist chamber (b), via outlet (b4), which is preferably in the form of the overflow of upper rim (h2) of funnel (h1) that forms the top part of downpipe (h), to vessel (a) flows through the space between the outside wall of downpipe (f4) and the inside wall of downpipe (h). Preferably, downpipe (h) extends downward to connect in liquid-tight fashion to opening (a1) of vessel (a), such that leakage of liquid is prevented. Downpipe (f4) extents downward to sieve (g) which is preferably located above the level of opening (a1), in other words downpipe (f4) extends less far down compared to downpipe (h). The permeate side of sieving membrane (g1) is located within downpipe (h), which is in fluid connection with opening (a1). In one embodiment, the diameter of downpipe (h) may decrease below the level of sieve (g), such that the liquid flowing through downpipe (h) is guided towards opening (a1).

In an alternative configuration, downpipe (f4) and downpipe (h) form a single downpipe. Liquid that flows from grist chamber (b), via outlet (b4), which is preferably in the form of the overflow of upper rim (h2) of funnel (h1) that forms the top part of downpipe (h), to vessel (a) flows through the same downpipe as through which hops received by sieve (g). Preferably, downpipe (h)/(f4) extends downward to connect in liquid-tight fashion to opening (a1) of vessel (a), such that leakage of liquid is prevented.

In one aspect, the invention concerns the hops dispenser (f) as described herein, which is preferably adapted for use in a minibrewery, most preferably for use in the minibrewery according to the invention.

The invention also concerns a kit of parts, comprising the system according to invention including at least one vessel according to the invention, such as 1-10 vessels. The kit of parts may further comprise at least one detachable beer tap configured to be attachable to the vessel via opening (a1) and/or at least one carbon dioxide cartridge. The kit of parts is typically defined by a visible connection and/or is provided in a single package. Preferably, the kit of parts is provided in a single package, e.g. box or wrapper.

Process

In one aspect, the invention concerns a process for brewing beer. The process according to the invention may also be referred to as being "for home brewing of beer" or "for small scale brewing of beer". The process according to the invention is advantageously performed using the system according to the invention. All definitions, features and preferred embodiments of the vessel and the system according to the invention equally apply to the process according to the invention. Likewise, preferred embodiments described for the process equally apply to the system, as will be appreciated by the skilled person.

The process according to the invention is typically executed by the system according to the invention, although the user of the system may play a crucial role in some steps. However, the system and process according to the invention are designed as such that the amount of actions to be executed by the user is minimized. At the same time, the process mimics large scale brewing processes closely, such that the beer obtained by the process and system according to the invention is typically of superior quality compared to prior art minibreweries.

The process according to the invention comprises:
(1) providing a grist bed at the bottom grist chamber (b);
(2) hydrating the grist bed by allowing water having a mash-in temperature to flow from vessel (a) through outlet (a4) to inlet (b1);
(3) mashing by heating the water according to a mashing trajectory, wherein the heating is effectuated by circulating the water through heater (d) to obtain mash;
(4) lautering the mash by filtration through the grist bed such that wort is flowed back to vessel (a);
(5) boiling the wort in vessel (a) by circulating the wort through heater (d), during which at least one batch of hops is introduced to the boiling wort in sieve (g);
(6) cooling the boiled wort by circulating the wort through cooler (e),
(7) detaching the vessel (a) comprising the cooled wort from the system;
(8) fermenting the cooled wort by pitching yeast to obtain beer.

Steps (2)-(6) and (8) are performed by the system, including vessel (a), while steps (1) and (7) are typically performed by the user of the system.

Mashing

In the process according to the invention, a grist bed is provided in a grist chamber. Typically, the user of the system adds the grist to the chamber, after which the chamber is closed. Any type of grist known in the art may be used, as well as mixtures of grist with other cereals. Grist is obtained by milling malt, which may be performed by the user or commercially available grist may be used. Moreover, once milled, the grist has a short shelf-life. The particle size of the grist is preferably in the range of 1-1.5 mm. The amount of grist used for providing the grist bed typically depends on the amount of mash water, and is preferably in the range of 0.05-1.0 kg grist, more preferably 0.15-0.3 kg grist per kg mash water. In absolute terms, typically 0.5-2.5 kg grist is used, preferably 1-1.5 kg. The effect of adjusting the grist to mash water ratio on the final beer is known by the person skilled in the art of beer brewing. The user of the system may adjust this ratio to his desire.

The grist bed has a bottom level and a top level. The bottom level is at or near the bottom of the grist chamber. Thus, the grist bed may be provided directly onto the bottom of the grist chamber, or there may be some space between the bottom of the vessel and the bottom level of the grist bed, in which case the grist bed may be placed on top of a bottom grid. During mashing, mash water is supplied to the grist chamber via an inlet, and after passage through the grist bed the mash water is discharged from the grist chamber through an outlet located opposite to the inlet. The flow of mash water may be horizontal or vertical, preferably vertical. In most preferred embodiment, the inlet is located below the bottom level of the grist bed and the outlet above the top level of the grist bed. As such, mash water is capable of passing through the grist bed from below, which ensures that air is effectively removed from the grist bed (pushed out) and the contact area between mash water and grist is as high as possible, which increases the efficiency of the mashing process.

Water is provided in the vessel. Typically, the user of the system adds the (tap) water to the vessel, after which the vessel is connected to the system. The temperature of the water that is provided is irrelevant, as the system is capable of heating the water to the desired mash-in temperature. The mash-in temperature is the temperature at which the mashing step starts. Water may be heated to the mash-in temperature by circulating it through the system, via outlet (a4) and heater (d), which is turned on, back to vessel (a) via inlet (a1), by action of pump (c). In a preferred embodiment, flow control unit (i) is in the second position, and the water is pumped through the system by pump (c) from vessel (a), through outlet (a4) and heater (d), which is turned on, cooler (e), which is turned off, flow control unit (i), where the flow of water is led via sieve (g) back to vessel (a) via inlet (a1). During this circulation, the heater heats the water to the mash-in temperature. When the mash-in temperature is reached, the circulation is stopped. This is typically controlled by temperature sensor (a10) and/or (d4).

Water having a mash-in temperature is supplied from the vessel (a) to the grist bed in the grist chamber (b). The water that is supplied to the grist chamber (b) is referred to as the mash water. To effectuate this flow, water is discharged from vessel (a) through outlet (a4) and is led to inlet (b1) of grist chamber (b). In a preferred embodiment, pump (c) pumps the water from outlet (a4) via heater (d), which is turned off, and flow control unit (i) in the first position, to inlet (b1)

located below the bottom level of the grist bed, such as below bottom grid (b6). As such, the grist bed is hydrated with mash water from the bottom, resulting in efficient hydration with the lowest possible amount of air remaining in the grist bed. The water may be preheated within the system, as described above, or water that is externally heated to the desired mash-in temperature may be used. As such, the exact temperature and volume of the water that is supplied by the user to the reservoir is not crucial for the system to operate optimally.

When the grist chamber is filled to the desired level, the mash water may be left undisturbed for a mash-in period, although such a mash-in period is not necessarily used. During the mash-in period, the cell walls of the grist are digested to a certain extent, which increases the accessibility of the starch within the grist. Controllable parameters (i) the volume of the mash water, (ii) the mash-in temperature, (iii) whether or not a mash-in period is applied and (iv) the duration of the mash-in period may be adjusted to desire by the user. The volume of the mash water typically depends on the size of the entire system and on the desired volume of the batch of beer to be produced, and is preferably set at such as 0.5-25 L, more preferably 1-15 L, even more preferably 3-10 L, most preferably 5-8 L. The mash-in temperature is preferably set at 30-70° C., more preferably 40-60° C., most preferably 45-55° C. The duration of the mash-in period is preferably set at 0-60 min, more preferably 10-30 min. Herein, a duration of 0 min indicates that no mash-in period is applied.

After filling of the grist chamber and the optional mash-in period, the mash step commences. As described in more detail below, during mashing the temperature of the mash water increases according to a pre-set trajectory. To effectuate this heating, mash water is discharged from the grist chamber (b) via outlet (b4) and circulated through heater (d), which is turned on when required for the mash trajectory, and led back to the grist chamber (b) via inlet (b4). In a preferred embodiment, pump (c) pumps water into grist chamber (b) via inlet (b4), which is discharged from the grist chamber via outlet (b4) in the form of an overflow. The discharged mash water is pumped through vessel (a), via inlet (a1) and outlet (a4), and via heater (d) and flow control unit (i) in the first position to inlet (b1) of the grist chamber (b). As such, a continuous flow of mash water through the grist bed positioned in grist chamber (b) and heater (d) is effectuated. By turning heater (d) on at specific points in time during mashing, the desired temperature increase of the mash trajectory is efficiently achieved.

The temperature of the mash water is first increased from the mash-in temperature to the initial mash temperature. In case no mash-in period is employed, the mash-in temperature at which the mash water is introduced in the vessel is conveniently equal to the initial mash temperature. During mashing, grist is degraded by enzymes present in the grist. Such degradation mainly involves hydrolysis of the starch present in the grist by $\square$-amylase enzymes. The obtained monomeric sugars dissolve in the mash water. Mashing is a process wherein the temperature of the mash water is increased using a certain trajectory, the mash trajectory. Such a mash trajectory involves a gradual or stepwise increase of the mash temperature. Herein, the temperature is increased over a period of time, the mash period, until the final mash temperature is reached. The specifics of the mash trajectory used may be freely chosen by the user of the system, and may be chosen depending on the type of grist and the specifics of the desired beer that is to be obtained. Although a gradual increase in temperature is possible, a stepwise increase is the preferred mash trajectory for most beers. It is thus preferred that the mash trajectory involves a stepwise increase in the temperature, as defined here below.

Gradual increase of the masking temperature is typically selected from a linear increase, an exponential increase and a logarithmic increase, preferably from a linear increase and an exponential increase. Herein, the duration of the mash period is preferably in the range of 30-180 min, more preferably 60-120 min. Herein, the final mash temperature is preferably in the range of 68-80° C., preferably 70-78° C. The final mash temperature preferably does not exceed 78° C., as above that temperature the $\square$-amylase quickly inactivates.

A mash trajectory involving stepwise increase of the mash temperature typically occurs as follows. After a certain time period being maintained at the initial mash temperature (the first enzyme break), the mash water is heated to the second mash temperature by turning the heater on, at which temperature the mash water is maintained for a time period (the second enzyme break), by turning the heater off. The second mash temperature may be the final mash temperature, and mashing is completed at the end of the second enzyme break, but more stepwise increases of the mash temperature may be implemented. Before and after each temperature increase an enzyme break is implemented, during which the enzymes are active in degrading the grist, in particular the starch therein. Thus, mashing preferably involves one or more stepwise increases of the mash temperature, preferably 1-4 stepwise increases, most preferably 1-2 stepwise increases.

A first typical mash trajectory involves an initial mash temperature in the range of 58-68° C., preferably 60-64° C., for a first enzyme break duration of 5-30 min, preferably 10-20 min, a single temperature increase to a final mash temperature in the range of 68-76° C., preferably 70-74° C., for a second enzyme break duration of 5-30 min, preferably 10-20 min. A second typical mash trajectory involves an initial mash temperature in the range of 48-58° C., preferably 50-54° C., more preferably about 52° C., for a first enzyme break duration of 5-30 min, preferably 15-25 min, more preferably about 20 min, a first temperature increase to a second mash temperature in the range of 58-68° C., preferably 60-64° C., more preferably about 62° C., for a second enzyme break duration of 5-30 min, preferably 15-25 min, more preferably about 20 min, a second temperature increase to a final mash temperature in the range of 68-76° C., preferably 70-75° C., more preferably about 72° C., for a third enzyme break duration of 15-45 min, preferably 20-40 min, more preferably about 30 min. Using such a mash trajectories, most types of grist will give satisfactory wort compositions. Although the use of unmalted grist may benefit from an initial mashing temperature in the range of 48-52° C. Fine-tuning of the mash trajectory may provide superior results for a particular user. Such fine-tuning of the mash trajectory is greatly facilitated by the present system. The total duration of the mash period is preferably in the range of 30-180 min, more preferably 60-120 min. The final mash temperature is preferably in the range of 68-76° C., preferably 70-74° C. The final mash temperature preferably does not exceed 76° C., as above that temperature the $\square$-amylase quickly inactivates.

The entire mash trajectory may be controlled by the user, which is referred to as controllable parameter (v). Controllable parameter (v) include: (v-1) the initial mash temperature, (v-2) the type of temperature increase (gradual or stepwise), (v-3) the type of gradual temperature increase (linear, exponential, logarithmic), (v-4) the amount of stepwise increases of the mash temperature, (v-5) the duration of each of the enzyme breaks at a certain mash temperature, (v-6) each of the intermediate mash temperatures, (v-7) the total duration of the mash period, and (v-8) the final mash temperature. It will be understood that parameter (v-3) only applies to gradual temperature increase and parameters (v-4)-(v-6) only to stepwise increase of the temperature. All of these parameters have a distinct impact on the composition of the wort and thus on the beer that is obtained by the present process. These effects are known by the person skilled in the art of beer brewing, and can be adjusted freely using the present process or system.

During mashing, stepwise increase of the temperature of the mash water is accomplished by removing the mash water from the vessel and leading it through heater (d) before it is returned to the vessel. In the heater (d), the mash water is heated to the desired temperature. In case a mash-in step is employed, the temperature increase from the mash-in temperature to the initial mash temperature is effected in the same manner. Heater (d) is preferably a pipe heater. The use of such pipe heaters is a marked improvement over the prior art, wherein typically immersion heaters or hot plates are used to heat the mash water. The use of a pipe heater provides quicker and more controlled heating, wherein a temperature increase of 2-4° C. per min can readily be achieved, compared to about 1° C. per min for prior art systems, and hotspots are avoided. As such, the heating is performed quickly, shortening the total time needed for completing the brewing process. Using a pipe heater, the heat is evenly distributed over the mash water, while immersion heaters often cause hotspots with temperatures as high as 150° C. The inventors found that both hotspots and slow heating negatively affect the mashing process, as the enzymes from the grist that degrade the starch inactivate more quickly one slowly heated or when heated to temperatures well above 80° C. In view of this increased enzyme activity, the process and system according to the invention is capable of liberating more sugar from grist, compared to conventional minibreweries. Furthermore, the inventors found that the thus obtained final beer has improved quality over beer from other minibreweries. In fact, a common problem associated with domestic beer brewing is that insufficient sugars are liberated from the grist, which is avoided with the present invention. Although these advantages are predominant using a mash trajectory with a stepwise increase in mash temperature, since this stepwise increase will be used for most if not all of brewing processes performed by the minibrewery of the invention, the use of a pipe heater still constitutes a major improvement. However, as one of the aims of the present minibrewery is to keep all options open for the user of the system to adjust the process parameters to his liking, the option of gradual temperature increase during mashing can also be implemented.

After completion of the mash step, thus when the last enzyme break period has lapsed, the mash water may be mashed-out. During mashing-out, the temperature of the mash water is increased such that the enzymes are inactivated. The temperature increase from the final mash temperature to the mash-out temperature is effected in the same manner as the stepwise temperature increases during mashing. During mash-out, the mash water is maintained for a mash-out period at the mash-out temperature. The mash-out temperature is typically in the range of 76-100° C., preferably 77-80° C., most preferably about 78° C. The duration of the mash-out period is preferably set at 0-30 min, more preferably 2-10 min. Herein, a duration of 0 min indicates that no mash-out period is applied. Typical mash-out is conducted at 78° C. for 5 minutes.

Controllable parameters (v) the specifics of the mash trajectory, including (v-1) the initial mash temperature, (v-2) the type of temperature increase (gradual or stepwise), (v-3) the type of gradual temperature increase (linear, exponential, logarithmic), (v-4) the amount of stepwise increases of the mash temperature, (v-5) the duration of each of the enzyme breaks at a certain mash temperature, (v-6) each of the intermediate mash temperatures, (v-7) the total duration of the mash period, and (v-8) the final mash temperature, (vi) whether or not a mash-out period is applied, (vii) the mash-out temperature, (viii) the duration of the mash-out period and (xvii) the heating rate at which the wort is heated, may all be adjusted to desire by the user.

Lautering

The optionally mashed-out mash water, which is also referred to as just "mash", is separated into a liquid fraction comprising sugars, referred to as wort, and a fraction of remaining solids, referred to as draff. This separation is known in the art as lautering. When using the system according the invention, lautering is efficiently accomplished by filtering the mash water through the spent grist bed, which is typically comprised between bottom and top grids (b6) and (b7). Any solid in the mash water is trapped in the spent grist bed. Such filtering through the grist bed is typically accomplished by allowing the mash water to flow back through inlet (b4) to vessel (a). In a preferred embodiment, flow control unit (1) is in the first position and pump (c) is turned off. Gravity enables the flow of the mash to vessel (a). If needed, pump (c) may be turned on during lautering, such that the wort flows from (b4), which temporarily acts as an outlet of grist chamber (b)), to (a4), which temporarily acts as an inlet of vessel (a). Thus, the flow of the pump is reversed during lautering, compared to the remainder of the process according to the invention. As such, all wort efficiently flows into vessel (a) for the next step of boiling the wort. Then, the grist bed may be rinsed with some additional water by the user, e.g. by pouring some water through an opening in the hatch (b2) of the grist chamber (b).

Boiling and Cooling

When the wort is separated from the draff, it is boiled in the presence of hops. The vessel (a) now acts as a copper. The wort in the vessel (a) is heated to a boiling temperature, by circulating the wort via outlet (a4) through heater (d), which is turned on, back to vessel (a) via inlet (a1). In a preferred embodiment, the wort is pumped by pump (c) via outlet (a4) though heater (d), which is turned on, cooler (e), which is turned off, flow control unit (i) in the second position, and sieve (g) to inlet (a1) of vessel (a). The temperature of the wort is typically monitored by temperature sensor (a10) and/or (d4), which in turn controls the operation of heater (d) and/or of pump (c), until the desired boiling temperature is reached. To maintain the boiling temperature during the entire boiling period, the heater (d) may be turned on or off occasionally or its power may be increased or decreased, depending on the desired boiling temperature and the actual temperature of the wort that passes the heater. Such monitoring of the temperature of the wort during the boiling stage, in particular by sensor (d4), allows efficient heating of the wort. For example, the heater (d) will only heat the wort that passes through the heater when needed, i.e. when the temperature thereof is too low, such as below the desired boiling temperature. As such, the heater does not need to be turned on continuously, which increases the process efficiency. At the same time, too vigorous heating of the wort and the formation of hotspots are avoided. Preferably, pump (c) is turned on during the entire boiling stage and heater (c) ensures that the desired boiling temperature is maintained.

At specific points in time during the boiling stage, preferably at 1-6 points in time, hops are introduced into sieve (g). The user of the system has provided at least one batch of hops in the hops dispenser (f), which is programmed to introduce the one or more batches of hops at a pre-set points in time. In addition to or instead of the at least one batch of hops, other flavourings as known in the art may also be provided in the hops dispenser (f) and released into sieve (g) at a pre-set point in time. Typically, at least one batch of hops is introduced. The release of the hops into sieve (g) is accomplished by activating means (f3). In a preferred embodiment, the carrousel is rotated such that the batch that is to be introduced at that point in time is shifted to the upper opening of downpipe (f4). The batch thus falls through downpipe (f4) into sieve (g). As during the boiling stage, at least part of the flow of wort passes through sieve (g), optionally via splitter (j), the wort is in contact with the hops. As such, valuable components of the hops, such as alpha acids that add flavour, mainly bitterness, and aroma to the final beer, are extracted from the hops.

As will be appreciated by the skilled person, the exact timing of the introduction of hops to the wort has a dramatic impact on the taste of the final beer. The skilled person is aware of these effects and is able to programme the hops introduction such that the most optimal beer is obtained. Some hops require early introduction to the boiling wort, while others, especially flavourings, are best introduced to the boiling wort late or even at the end of the boiling stage. The duration of the boiling stage is typically at least 0.5 h, preferably 1-2 h, although other boiling periods may advantageously be used for specific beers. As will be appreciated by the skilled person, the duration as well as the temperature of the boiling stage can be adjusted to ensure optimal extraction of components (alpha acids) from the hops and optimal isomerisation of these alpha acids to iso-alpha acids. In that light, any type of hops and optionally other flavourings can be used, depending on the wishes of the user. As such, the user can tune the beer brewing process towards the formation of the beer of his or her liking.

During the boiling stage, steam may be collected and condensed in the grist chamber (b). To minimize losses of the volume of the wort, the condensed steam may be returned to vessel (a). Typically, the steam condenses onto the inside of the cover or hatch (b2) of grist chamber (b) and forms droplets of water, which may fall back into vessel (a) through downpipe (h) or (f4). Steam may also condense in the grist bed or may leave the system though an opening or steam vent in the hatch (b2) of the grist chamber (b). During the boiling stage, sieve (g) will accumulate various batches of hops and other flavourings. The inventors found that this accumulation does not negatively affect the extraction of components.

Upon completion of the boiling stage, it is important that the wort is quickly cooled down, preferably to a temperature in the range of 15-25° C. Generally speaking, the quality of the obtained final beer is most optimal when the wort is cooled quickly, preferably within 30 min, more preferably within 15 min, most preferably within 5 min. The present system is capable of cooling the boiled wort that quickly by virtue of cooler (e). Particularly quick and efficient cooling can be achieved when using a evaporative cooler, but the inventors found that the use of a (plate) heat exchanger suffices for rapid cooling. Such a heat exchanger typically requires 2-10 L or even 4-8 L of cooling liquid, conveniently cold tap water, per litre of wort. Using such amounts of water, the wort can be cooled within 10 min or even within 5 min.

To switch from the boiling stage to the cooling stage, heater (d) is turned off and cooler (e) is turned on. Flow control unit (i) remains in the second position. The cooling process may be monitored by temperature sensors (a10) and/or (d4), and when the desired temperature, typically about 25° C., is reached, the cooler (e) and pump (c) are turned off.

Controllable parameters (ix) the amount of hops and/or flavourings batches that are introduced into sieve (g), (x) the point in time of the introduction of each batch, (xi) the total duration of the boiling stage, (xii) the boiling temperature and (xiii) the final temperature of cooled wort the may all be adjusted to desire by the user.

Fermenting

The cooled wort is subsequently subjected to a fermentation step. Fermentation is well-known in the art and any type or variant known is covered by the present process. A fermentation step may contain several stages. First of all, yeast is pitched, i.e. added to the vessel. In order to pitch yeast, the user may open inlet (a1) of the vessel (a) containing the cooled wort. The opening of inlet (a1) ensures that sufficient air is entered into vessel (a), such that the cooled wort is sufficiently aerated to enable fermentation by the yeast. Alternatively, a small container, referred to as trub container, filled with yeast is connected to valve (a4), which is then opened in order to mix yeast into the wort. In order to be able to pitch the yeast, it may be required to detach vessel (a) from the system. As such, the brewing process is continued in vessel (a) in stand-alone mode. However, although somewhat impractical, the fermentation step could also be performed while the vessel is connected to the system. Then, valve (a4) needs to be closed to prevent cooled wort from being discharged from vessel (a). It is thus preferred that fermentation is performed in vessel (a), which is detached from the remainder of the system. The ability to conclude the brewing process in a stand-alone mode, without the need of transferring the cooled wort, is a great improvement over the prior art. First of all, the brewing process up to the point of pitching yeast typically takes about 2-5 h, preferably 3-4 h or about 3.5 h, while the fermentation step may take as long as 1-3 weeks. As such, the same system can be used again for a subsequent brewing process, using a further vessel. Since no transfer of wort is needed, the chances of contamination of the wort is greatly reduced. Moreover, no sterilization and/or decontamination is required, as the wort has been boiled in the same vessel (a) prior to fermentation. It is known in the art that special care needs to be taken to keep the wort sterile after being boiled, otherwise the quality of the final beer quickly deteriorates. The use of a single vessel for boiling, cooling, fermenting and eventually drawing the beer reduces the chance of contamination to an absolute minimum. Detaching the vessel from the system requires closing of the valve of outlet (a4). Depending on the exact configuration, hops dispenser (f), grist chamber (b) and downpipe (h) may need to be detached from the system, prior to detachment of the vessel.

Any type and amount of yeast may be used for pitching. Dry yeast and liquid yeast are equally suitable and the user may prepare the yeast prior to pitching as deemed fit and known in the art. To keep the interior of the vessel sterile, opening (a1) should be closed after pitching, to which end a lid or hatch may be provided.

Whether in stand-alone mode or still connected to the system, the fermentation temperature is maintained by temperature control element (a3). Information of the temperature within the vessel is typically provided by sensor (a10). Via connection (a9'), the vessel is connected with an operating system which may provide a pre-set fermentation temperature. Any means of fermenting wort, including any fermentation temperature, known in the art can be used. The duration of the fermenting step is typically in the range of 5-25 days, preferably 10-14 days. The fermentation period may vary, depending on the type of beer being produced and/or the desire of the user. In a preferred embodiment, the vessel (a) has a conical bottom part having a downward pointing apex. Fermentation vessels having such an inside shape are known in the art as "conicals".

During fermentation, the yeast converts malt sugars to ethanol and carbon dioxide. Spent yeast accumulates at the bottom of vessel (a). In a preferred embodiment, the vessel has a conical bottom part having a downward pointing apex, which facilitates settling of the spent yeast at the apex. For most beer types, spent yeast needs to be removed after completion of the fermentation step. Spent yeast can be removed by opening the valve of outlet (a4) and draining a small amount of liquid containing the settled spent yeast. This may conveniently be performed using a ball valve, wherein the user connects a container of small volume (also referred to as trub container), typically 0.0001-0.1 times, preferably 0.01-0.05 times, the volume of space (a2), is connected to the valve, and the yeast collected at the bottom of space (a2) will be transferred to this container of small volume when outlet (a4) is opened. After closing of outlet (a4), the ball valve containing the spent yeast may be removed. This process may be repeated once or twice in case not all yeast is removed in the first step. In an alternatively preferred embodiment, a detachable beer tap is placed on the vessel via opening (a1) and connected to riser (a7). Spent yeast can be removed by drawing liquid from the vessel trough riser (a7) using the beer tap. After removal of the spent yeast, the remaining liquid in the vessel is beer and ready to be drawn using the beer tap and consumed.

To facilitate drawing of liquid, either the suspension of spent yeast or the beer, it is preferred that the pressure within the vessel is increased. Conveniently, a carbon dioxide cartridge is installed, preferably in the beer tap, as known in the art. As the fermentation temperature is typically different from the optimal serving temperature, it is preferred that the temperature of the beer is brought to the serving temperature by the temperature control element (a3). Typically, the user submits to the operating system, preferably by means of the application, that fermentation is completed and the operating system will instruct the vessel (a), in particular temperature control element (a3), to bring the temperature to the serving temperature. As the optimal serving temperature may differ from different beer types, this temperature may be freely selected by the user.

Controllable parameters (xiv) the fermentation temperature, (xv) the fermentation duration and (xvi) the serving temperature may all be adjusted to desire by the user.

In a further aspect, the invention concerns a program for executing the process according to the invention, except for the steps that are performed by the user. More particularly, the program is capable of executing steps (2)-(6) and (8) of the process according to the invention, as defined below. Typically, the user of the invention performs steps (1) and (7), and the program is for executing the remaining steps. The program according to the invention is loaded onto the processing unit and/or the onto the operating system that controls the processing unit. The program according to the invention may also be referred to as a "computer program" or as "software".

FIGURE

The FIGURE depicts a preferred embodiment of the system according to the invention, in cross-sectional view, with reference to the reference signs defined above. The skilled person understands how to implement all components, even if those are not depicted in the FIGURE. In the FIGURE, the first and second positions of flow control unit (i) is depicted with numbers 1 and 2 respectively. In the depicted embodiment, sieve (g) is located within space (a2) and downpipes (f4) and (h) are a single downpipe, referred to as (h) in the FIGURE.

The invention claimed is:
1. A system for batch-wise brewing of beer, wherein the system comprises:
  (a) a double-walled vessel, detachable from the system, for boiling and fermenting wort, comprising:
    (i) an opening for receiving liquid and yeast;
    (ii) a space for holding the liquid;
    (iii) a temperature control element located between an outside wall and an inner wall of the double-walled vessel;
    (iv) an outlet, equipped with a valve, for discharging liquid;
    (v) a controller capable of controlling the temperature control element, which contains a connection to an operating system;
  (b) a grist chamber, comprising:
    (i) an inlet for receiving liquid;
    (ii) an entry for receiving grist;
    (iii) a space for holding a grist bed;
    (iv) an outlet for discharging liquid,
  wherein the inlet for receiving liquid to the grist chamber and the outlet for discharging liquid from the grist chamber are located at opposite ends of the space for holding a grist bed;
  (c) a pump;
  (d) a heater;
  (e) a cooler;
  (f) a hops dispenser, comprising:
    (i) at least one hops chamber;
    (ii) an entry for receiving hops;
    (iii) a dispenser to dispense the hops from the hops chamber to a sieve, comprising:
      (A) a sieving membrane capable of retaining hops and permeating liquid;
      (B) an inlet for receiving liquid;
      (C) a space for holding hops, and
  (g) a flow control unit capable of switching between a first position that allows flow of liquid from the vessel to the grist chamber, and a second position that allows flow of liquid from the vessel to the sieve,
  wherein, when the vessel is contained in the system, the outlet for discharging liquid from the grist chamber is in fluid connection with the opening for receiving liquid and yeast to the vessel, the outlet for discharging liquid from the vessel is in fluid connection with the flow control unit, the flow control unit is in fluid connection with the inlet for receiving liquid to the grist chamber and with the inlet for receiving liquid to the sieve, and the permeate side of the membrane is in fluid connection with the space for holding the liquid.

2. The system according to claim 1, wherein the vessel is contained in the system.

3. The system according to claim 2, wherein the outlet for discharging liquid from the grist chamber is an overflow into a downpipe that extends downward to the opening for receiving liquid and yeast to the vessel.

4. The system according to claim 1, wherein the hops dispenser comprises a downpipe that extends downwards to the space for holding hops in the sieve.

5. The system according to claim 3, wherein the downpipe that extends downward to the opening for receiving liquid and yeast to the vessel and the downpipe that extends downwards to the space for holding hops in the sieve are a single downpipe or wherein the downpipe that extends downwards to the space for holding hops in the sieve extends downwards in the interior of the downpipe that extends downward to the opening for receiving liquid and yeast to the vessel.

6. The system according to claim 1, wherein the heater is a pipe heater.

7. The system according to claim 1, wherein the cooler is a heat exchanger or an evaporative cooler.

8. The system according to claim 1, wherein the hops dispenser is circular and comprises walls that radially extend from the midpoint to a periphery of the circle, forming a boundary between slice-shaped hops chambers.

9. The system according to claim 1, wherein an upper part of the space for holding the liquid in the vessel is cylindrical and a bottom part of the space for holding the liquid is conical having a downward pointing apex.

10. The system according to claim 1, wherein the opening for receiving liquid and yeast to the vessel is provided with a beer tap connector and wherein the vessel or the beer tap further comprises a connection for a carbon dioxide cartridge.

11. The system according to claim 1, wherein the vessel further comprises a temperature sensor located within the space for holding the liquid.

12. The system according to claim 1, wherein the temperature control element is a Peltier element.

13. The system according to claim 1, wherein the connection is an internet connection to an online operating system.

14. The system according to claim 1, wherein the space for holding the liquid has a total volume of 3-10 L.

15. The system according to claim 1, further comprising a riser extending from the bottom of the vessel to opening for receiving liquid and yeast to the vessel.

16. The vessel according to claim 1, wherein the heater is located in the fluid connection between the outlet for discharging liquid from the grist chamber and the inlet for receiving liquid to the grist chamber.

17. The vessel according to claim 16, wherein the heater is located in the fluid connection between the outlet for discharging liquid from the grist chamber and the flow control unit.

18. A kit of parts, comprising the system according to claim 1.

19. The kit of parts according to claim 18, further comprising at least one detachable beer tap configured to be attachable to the vessel via the opening for receiving liquid and yeast to the vessel and/or at least one carbon dioxide cartridge.

20. A process for brewing of beer in the system according to claim 1, comprising:
(1) providing a grist bed at the bottom of the grist chamber;
(2) hydrating the grist bed by allowing water having a mash-in temperature to flow from the vessel through the outlet for discharging liquid from the vessel to the inlet for receiving liquid to the grist chamber;
(3) mashing by heating the water according to a mashing trajectory, wherein the heating is effectuated by circulating the water through the heater to obtain a mash;
(4) lautering the mash by filtration through the grist bed such that wort is flowed back to the vessel;
(5) boiling the wort in the vessel by circulating the wort through the heater, during which at least one batch of hops is introduced to the boiling wort in the sieve;
(6) cooling the boiled wort by circulating the wort through the cooler,
(7) detaching the vessel comprising the cooled wort from the system; and
(8) fermenting the cooled wort by pitching yeast to obtain beer.

21. The process according to claim 20, wherein 3-6 batches of hops are introduced during step (5).

22. The process according to claim 20, wherein at the end of step (8) a beer tap is applied to the vessel comprising beer.

23. The process according to claim 20, wherein at the end of step (8) spent yeast is removed from the beer.

24. The process according to claim 20, wherein the process is controlled by an operating system which is programmable by a user.

25. The process according to claim 24, wherein the user is able to set values for one or more of the parameters selected from:
(i) the volume of the mash water;
(ii) the mash-in temperature;
(iii) whether or not a mash-in period is applied;
(iv) the duration of the mash-in period;
(v) the entire mash trajectory, including the initial mash temperature, the type of temperature increase, the type of gradual temperature increase, the amount of stepwise increases of the mash temperature, the duration of each of the enzyme breaks at a certain mash temperature, each of the intermediate mash temperatures, the total duration of the mash period, and the final mash temperature;
(vi) whether or not a mash-out period is applied;
(vii) the mash-out temperature;
(viii) the duration of the mash-out period;
(ix) the amount of hops and/or flavourings batches that are introduced to the boiling wort;
(x) the point in time of the introduction of each batch of hops and/or flavourings;
(xi) the total duration of the boiling stage;
(xii) the boiling temperature or trajectory;
(xiii) the final temperature of cooled wort;
(xiv) the fermentation temperature;
(xv) the fermentation duration,
(xvi) the serving temperature, and
(xvii) the heating rate at which the wort is heated.

\* \* \* \* \*